No. 641,913. Patented Jan. 23, 1900.
H. WISE.
ADJUSTABLE BICYCLE REST.
(Application filed Aug. 8, 1898.)
(No Model.)
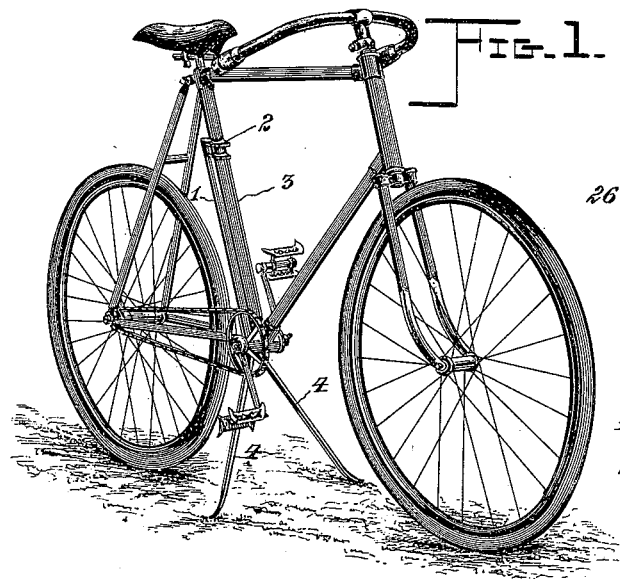
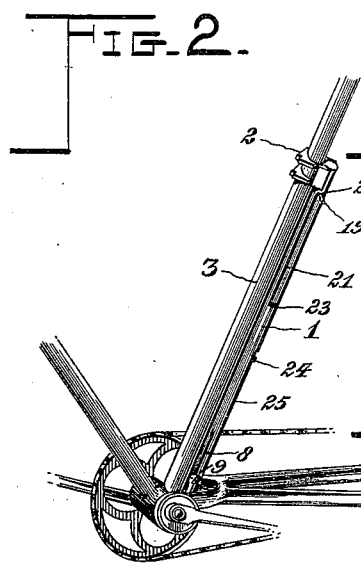
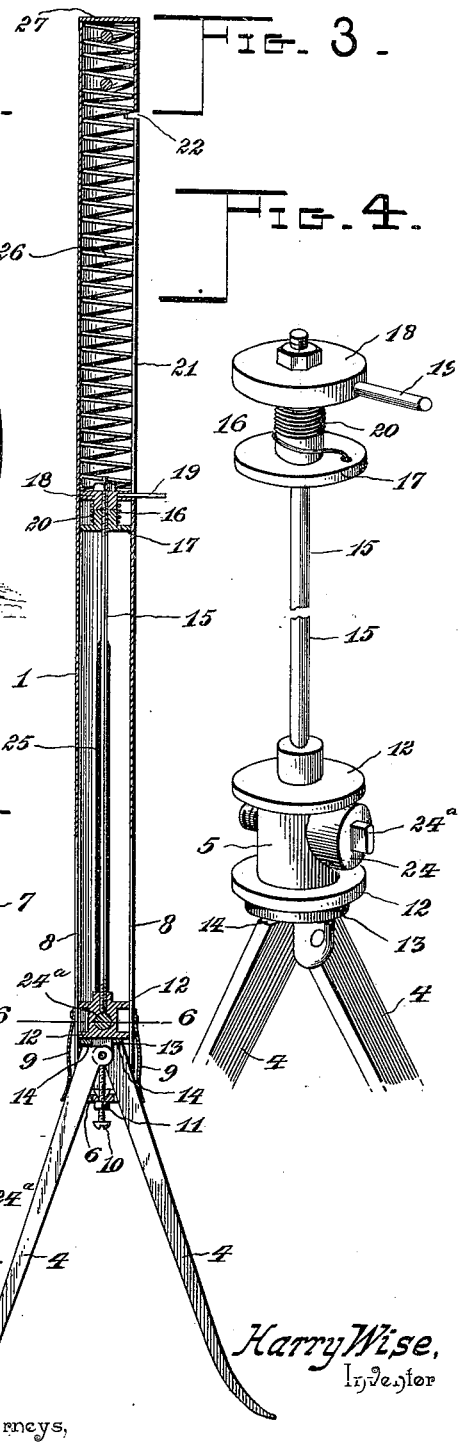
Witnesses
John F. Senferwiel
O. S. Hoyle
Harry Wise,
Inventor
By his Attorneys,
C. A. Snow & Co.

UNITED STATES PATENT OFFICE.

HARRY WISE, OF SAN ANTONIO, TEXAS, ASSIGNOR OF ONE-HALF TO H. WULFF MAYER, OF SAME PLACE.

ADJUSTABLE BICYCLE-REST.

SPECIFICATION forming part of Letters Patent No. 641,913, dated January 23, 1900.

Application filed August 8, 1898. Serial No. 688,056. (No model.)

*To all whom it may concern:*

Be it known that I, HARRY WISE, a citizen of the United States, residing at San Antonio, in the county of Bexar and State of Texas, have invented a new and useful Adjustable Bicycle-Rest, of which the following is a specification.

My invention relates to adjustable bicycle supports or rests, and has for its object to provide a simple and efficient construction of rest adapted to be applied to the frame of a bicycle or similar vehicle and having means whereby the extensible feet may be folded and projected with facility and under the control of the rider.

A special object of my invention is to provide automatically-operated locking devices for securing the feet or legs in their extended and folded positions, which prevent the accidental extension thereof by jarring or otherwise.

A further object of my invention is to provide simple means for preventing the rattling of the legs during the movement of the machine and also to prevent the access to the casing or sheath of mud and dirt which may accumulate upon the legs during their extension.

Further objects and advantages of this invention will appear in the following description, and the novel features thereof will be particularly pointed out in the appended claims.

In the drawings, Figure 1 is a view of a support or rest constructed in accordance with my invention applied in the operative position to a bicycle, the legs being shown extended. Fig. 2 is a view of the same with the legs folded, showing a portion of the vehicle. Fig. 3 is a longitudinal section of the rest or support. Fig. 4 is a detail view of the connected plunger and follower-head with the contiguous portions of the supporting-legs detached from the casing. Fig. 5 is a detail view of the spreader detached. Fig. 6 is a detail transverse section of the follower and casing on the plane indicated by the line 6 6 of Fig. 3.

Similar numerals of reference indicate corresponding parts in all the figures of the drawings.

The bicycle rest or support embodying my invention consists, essentially, of a tubular casing or sheath 1, provided at a suitable point, as adjacent to its upper end, with a clamp 2 for engagement with a frame-bar of the vehicle, such as the seat-post tube 3, whereby the lower end of the casing or sheath is arranged beneath the planes of the rear braces, and legs 4, mounted for extension through the lower end of the casing or sheath and carried by a follower 5, which fits for reciprocatory movement within the sheath. Removably fitted in the lower end of the casing or sheath is a spreader 6, having diametrically opposite guide notches or openings 7, which register with guide-slots 8 in the casing or sheath near its lower end, and are adapted to receive the supporting-legs 4, whereby as the follower descends in the casing or sheath to extend the supporting-legs the latter are capable of free movement to avoid stoppage by reason of said slots in the casing. The lower extremities of the supporting-legs are preferably flared or turned outward, and as said legs descend upon opposite sides of the follower their outer sides are separated, and hence I find it desirable in practice to provide the longitudinal slots 8 to allow free movement of the legs and avoid friction with the walls of the casing or sheath. In order to prevent outward displacement of the supporting-legs, however, I employ bearing-springs 9, terminally arranged in the planes of said slots to bear against the outer edges of the supporting-arms and hold the inner edges thereof in contact with the spreader, or, in other words, in contact with the inner ends of the notches formed in the spreader. Thus as the follower descends in the casing or sheath the supporting-legs are gradually spread, and the interval between the lower ends of the legs depends upon the amount of extension of those legs, and hence upon the extent of downward movement of the follower. In order that this extension movement may be controlled, I mount in the spreader an adjustable stop 10, consisting in the construction illustrated of a screw projecting axially into the casing or sheath and fitted exteriorly of the spreader with a jam-nut 11, whereby said stop may be locked at the desired adjustment. The extremity of this screw, which forms the adjustable stop, is arranged in the path of the lower end of the follower, and by varying the adjustment of the stop the extent of separation of the lower extremities of the supporting-legs may be correspondingly regulated.

The follower in the construction illustrated consists of a body portion having upper and lower flanges 12, a washer 13 being interposed between the lower flange or head and the upper extremities of the supporting-legs, said upper extremities being abruptly terminated to form shoulders 14 to bear against the washer when the legs are fully extended, as when the vehicle is subjected to downward pressure after the complete extension of the supporting-legs. In other words, if the follower is in contact with the stop and for any reason downward pressure should be applied to the vehicle while the supporting-legs rest upon the ground the legs will be still further spread in opposition to the tension of the guide or bearing springs 9 until said shoulders come in contact with the washer. This, therefore, forms a positive stop to limit further depression and prevents straining of the other parts of the apparatus. As soon as said weight is removed the supporting-legs are returned to their normal positions by the tension of the bearing or guide springs.

Connected rigidly, as by a rod 15, with the follower is a plunger 16, consisting, essentially, of a body portion, which terminates at its lower end in a fixed disk 17, fitting snugly in the bore of the casing or sheath, and provided at its upper end with a revoluble disk or head 18, provided with a radial operating pin or grip 19 and connected with the fixed disk by a spring 20, coiled upon the body portion of the plunger and adapted to yieldingly hold the revoluble disk and its attached operating pin or grip in the normal position. This operating pin or grip is arranged to project through a longitudinal guide-slot 21, formed in the casing or sheath and provided with terminal offsets or seats 22 and 23, into which said pin or grip at the limits of movement of the plunger is forced by the said actuating-spring of the revoluble disk or head. In other words, to extend the legs into operative position it is necessary to disengage the operating pin or grip from the upper offset or seat of the guide-slot in order to bring said pin or grip into alinement with the body portion of the slot, and when the parts reach the extended position the operating pin or grip is automatically thrown into engagement with the lower offset or seat to hold the parts in their adjusted positions. Obviously this operation of the pin or grip depends upon preventing the rotation of the body portion of the plunger in the casing or sheath, and I accomplish the guiding of said part, so as to prevent rotation, by fitting the follower with a lateral guide-pin 24, which extends into a guide-slot 25, formed longitudinally in the casing or sheath, said guide-pin projecting radially from the body portion of the follower and consisting of a body portion terminating in a reduction 24ᵃ. The shoulder between the body portion of the guide-pin and its reduced outer end bears against the inner surface of the casing or sheath to prevent undue vibration of the parts, and the pin is further provided with a reduced and threaded inner end engaged with a diametrical threaded opening in the follower to enable said pin to be adjusted readily to take up lost motion due to wear.

It is desirable under certain circumstances or by certain riders that the extension of the supporting-legs should be accomplished automatically when released, and to provide for this I employ an extending spring 26, coiled within the casing or sheath, with one end in contact with a head 27, fitted in the upper end of the casing or sheath. It is obvious that when the plunger is disengaged by turning the operating pin or grip out of the upper offset or seat of the slot in which it operates the force of the extending spring will promptly throw the supporting-legs to their operative position. The adjustable stop 10, which is arranged in the path of the follower, receives the impact of the latter due to the expansion of the extending spring 26, and thus relieves the locking-pin 19 of strain due to the extension of the support. Furthermore, it is obvious that by adjusting this stop 10 the terminal position of the follower may be varied with relation to the spreader 6, and therefore that the extent of separation of the lower extremities of the supporting-legs 14 may be varied; but in order that this adjustment may be accomplished while preserving the relation of the locking-pin 19 to the lower terminal offset or seat of the slot 21 the body portion of the plunger 16, as shown, is threaded upon the rod 15, whereby the interval between the plunger and the follower may be varied to suit the adjustment of the pin 10. Also threaded upon the upper extremity of the rod 15 is a nut to bear upon and hold the revoluble disk or head 18 in operative relation with the body portion of the plunger, all as clearly shown in Figs. 3 and 4. A further function of the guide or bearing springs employed for contact with the outer sides of the supporting-legs and for holding the inner sides of said legs in contact with the spreader consists in the fact that after the extension of the legs the folding thereof or the movement of the same into the casing or sheath will cause the lower free ends of said guide or bearing springs to traverse the outer surfaces of the supporting-legs, and thus relieve the latter of any accumulations of soil thereon to prevent carrying foreign matter into the interior of the casing or sheath. The sides of the notches in the spreader perform a similar function for the opposite side and inner surfaces of the supporting-legs.

It will be understood in practice that various changes in the form, proportion, and the minor details of construction may be resorted to without departing from the spirit or sacrificing any of the advantages of this invention.

Having described my invention, what I claim is—

1. A rest for bicycles and similar vehicles, having a tubular casing or sheath provided with means for attachment to a frame-bar, a follower mounted for reciprocatory movement in the casing or sheath, supporting-legs pivotally connected with the follower, and a spreader fitted in the lower end of the casing or sheath between said supporting-legs, and provided with an adjustable stop in the path of the lower end of the follower to limit the extension of the legs, substantially as specified.

2. A rest for bicycles and similar vehicles, having a tubular casing or sheath provided with means for attachment to a frame-bar, a follower mounted for reciprocatory movement in the casing or sheath, supporting-legs pivotally connected with the follower, a spreader fitted in the lower end of the casing or sheath between the supporting-legs, and an adjustable stop consisting of a screw fitted axially in the spreader with its inner extremity in the path of said follower, and means for locking said screw at the desired adjustment, substantially as specified.

3. A rest for bicycles and similar vehicles, having a tubular casing or sheath provided with means for attachment to a frame-bar, a follower mounted for reciprocatory movement in the casing or sheath, supporting-legs pivotally connected with the follower, a stationary spreader arranged between the supporting-legs for contact with their inner surfaces to deflect them as they are extended, and spring-scrapers mounted upon the casing or sheath with their lower extremities in contact with the surfaces of the supporting-legs, and bearing inward thereon, to hold the inner surfaces of the legs in contact with the spreader, substantially as specified.

4. A rest for bicycles and similar vehicles, having a tubular casing or sheath provided with means for attachment to a frame-bar, a follower mounted for reciprocatory movement in the casing or sheath, supporting-legs pivotally connected with the follower, a spreader arranged between the supporting-legs to deflect them as they are extended, and guide or bearing springs arranged in contact with the outer surfaces of the supporting-legs to hold them yieldingly in contact with the spreader and prevent excessive deflection thereof, substantially as specified.

5. A rest for bicycles and similar vehicles, having a tubular casing or sheath provided with means for attachment to a frame-bar, a follower mounted for reciprocatory movement in the casing or sheath, supporting-legs pivotally connected with the follower, the casing or sheath being provided at its lower end with diametrically opposite longitudinal slots in which the outer sides of the supporting-legs are adapted to operate, a spreader arranged between the supporting-legs to deflect them as they are extended, and guide or bearing springs mounted in alinement with said slots and bearing terminally against the exterior surfaces of the supporting-legs, substantially as specified.

6. A rest for bicycles and similar vehicles, having a tubular casing or sheath provided with a longitudinal guide-slot having terminal offsets or seats, a follower mounted for reciprocatory movement in the casing or sheath, pivotal supporting-legs carried by the follower, means for preventing rotary movement of the follower in the casing, and a plunger having its body portion rigidly connected with the follower and provided with a revoluble disk or head carrying an operating pin or grip to operate in said slot, substantially as specified.

7. A rest for bicycles and similar vehicles, having a tubular casing or sheath provided with a longitudinal guide-slot having terminal offsets or seats, a follower mounted for reciprocatory movement in the casing or sheath, pivotal supporting-legs carried by the follower, means for preventing rotary movement of the follower in the casing, and a plunger having its body portion rigidly connected with the follower and provided with a revoluble spring-actuated disk or head carrying an operating pin or grip to operate in said slot, substantially as specified.

8. A rest for bicycles and similar vehicles, having a tubular casing or sheath provided with a longitudinal slot having terminal offsets or seats, supporting-legs mounted in the casing or sheath for extension beyond the lower end thereof, in coöperation with a spreader, a plunger mounted for reciprocatory movement in the casing and provided with a revoluble disk or head carrying an operating pin or grip extending through said slot of the casing, an actuating-spring for said disk or head, to cause the automatic engagement of the pin or grip with one of the terminal offsets or seats of said slot, and connections between the plunger and the supporting-legs, substantially as specified.

9. A rest for bicycles and similar vehicles, having a tubular casing or sheath provided with a longitudinal guide-slot having terminal offsets or seats, a follower mounted for reciprocatory movement in the casing, a radial guide-pin adjustably mounted upon the follower and extending terminally into a second longitudinal slot in the casing or sheath, said guide-pin having a shoulder adapted to bear against the inner surface of the casing or sheath and prevent lateral play, supporting-legs mounted upon the follower and coöperating with a spreader at the lower outlet end of the casing, and a plunger rigidly connected with the follower and having a rotary head or disk carrying an operating pin or grip extending through the first-named slot of the casing, substantially as specified.

In testimony that I claim the foregoing as my own I have hereto affixed my signature in the presence of two witnesses.

HARRY WISE.

Witnesses:
 H. MENGER,
 HARRY C. SEELE.